(12) United States Patent
Huber et al.

(10) Patent No.: US 7,942,039 B2
(45) Date of Patent: May 17, 2011

(54) METHOD AND ENGINE CONTROL UNIT TO DETECT COMBUSTION MISSES IN PART-ENGINE OPERATION

(75) Inventors: Martin Huber, Marbach Am Neckar (DE); Klaus Herz, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 12/229,345

(22) Filed: Aug. 21, 2008

(65) Prior Publication Data
US 2009/0049895 A1    Feb. 26, 2009

(30) Foreign Application Priority Data
Aug. 24, 2007    (DE) .................... 10 2007 040 117

(51) Int. Cl.
*G01M 15/11* (2006.01)
(52) U.S. Cl. .................... 73/114.02; 73/114.03
(58) Field of Classification Search ............... 73/114.02, 73/114.03
See application file for complete search history.

(56) References Cited

U.S. PATENT DOCUMENTS

| | | | | |
|---|---|---|---|---|
| 5,460,129 A * | 10/1995 | Miller et al. | ............... | 123/90.15 |
| 6,820,597 B1 * | 11/2004 | Cullen et al. | ................... | 123/520 |
| 6,843,229 B2 * | 1/2005 | Bauerle et al. | ................. | 123/396 |
| 6,876,919 B2 * | 4/2005 | James et al. | ................... | 701/111 |
| 7,019,414 B2 * | 3/2006 | Albertson et al. | .......... | 290/40 B |
| 7,059,997 B2 * | 6/2006 | Nishizawa et al. | ............... | 477/3 |
| 7,188,023 B1 * | 3/2007 | O'Daniel et al. | ............. | 701/111 |

* cited by examiner

*Primary Examiner* — Freddie Kirkland, III
(74) *Attorney, Agent, or Firm* — Kenyon & Kenyon LLP

(57) ABSTRACT

In a method for detecting combustion misses in cylinders of a combustion engine in part-engine operation in which only some of the cylinders are operated by the injection of fuel, a positional angle of the crankshaft is assigned to an angle segment; each angle segment is assigned to the particular cylinder which predominantly provides the torque for moving the crankshaft through the angle segment; an irregular running datum is determined as a function of a difference of segment pass-through times of immediately successive angle segments; and a combustion miss is detected if the irregular running datum exceeds or undershoots a limit value. In part-engine operation, the irregular running datum is determined only for two successive angle segments that are assigned to a combusting cylinder and to a non-combusting cylinder.

7 Claims, 2 Drawing Sheets

METHOD AND ENGINE CONTROL UNIT TO DETECT COMBUSTION MISSES IN PART-ENGINE OPERATION

BACKGROUND OF THE INVENTION

1. Field of the Invention

The present invention relates to a method and an engine control unit for detecting combustion misses in part-engine operation in which only some of the cylinders are operated.

2. Description of Related Art

In a certain engine control concept for a combustion engine the cylinders of a combustion engine are subdivided into a plurality of cylinder groups, which are triggered independently of each other. If a lower torque is to be requested in such a combustion engine, it is possible to deactivate one or a plurality of cylinders. Such an operating type is referred to as part-engine operation. If half of the cylinders are deactivated, then this is referred to as half-engine operation. In one type of half-engine operation, the deactivation of the one half of the cylinders is implemented by deactivating the intake and discharge valves as well as the injection (HEO). As an alternative, another type of half-engine operation may also be realized solely by deactivation of the injection (HEOIVD), which means that air is pumped through the cylinders, so that the following converter is no longer able to convert at $\lambda=1$. For this reason, HEOIVD is realized only in the configuration of a bank suppression since one exhaust-gas bank will then always be activated normally and completely. In half-engine operation, all cylinders are then blanked out (deactivated) on the second exhaust-gas bank.

Legal provisions in the U.S. and in Europe require the detection of non-combusting cylinders (cut-outs). Conventional methods for this purpose consist of monitoring irregular running, the ion-flow method, analysis of the combustion chamber pressure, or an analysis of the $\lambda$ value. Monitoring the irregular running is a frequently used method in which the angular acceleration of the crankshaft, which is determined by the read-in and conditioning of the speed sensor signal (pulse-generator wheel), is analyzed. An engine working cycle is subdivided into angle segments and assigned to the particular cylinder that is predominantly responsible for the given angular acceleration. For each angle segment, the pass-through time is determined and corrected via an adaptation algorithm which compensates for the tolerances of the pulse-generator wheel. The corrected segment times may be evaluated with regard to the response with respect to other cylinders or with respect to the own time characteristic.

One central variable used to evaluate the segment times so as to determine combustion misses is the irregular running luts (n) of a segment, which is a function of the difference between the segment times of successive segments.

For the half-engine operation (i.e., for HEO and HEOIVD), the evaluation methods for the segment times or the irregular running calculation must be adapted since extended segment times occur there in the deactivated cylinders for system-related reasons. Without adaptations, the partial diagnoses in the deactivated cylinders may respond and cause unfounded fault memory entries.

BRIEF SUMMARY OF THE INVENTION

It is an object of the present invention to provide a method and an engine control system by which the detection of combustion misses in part-engine operation is able to be improved.

According to the present invention, a method is provided for detecting combustion misses in cylinders of a combustion engine in part-engine operation, in which only some of the cylinders are operated by the injection of fuel. The detection of combustion misses is to be implemented only for the actually combusting cylinders. A positional angle of the crankshaft is assigned to an angle segment, each angle segment being assigned to the particular cylinder that predominantly provides the torque for moving the crankshaft through the angle segment, an irregular running datum is determined as a function of a difference of segment pass-through times of immediately successive angle segments, and a combustion miss is detected if the indicated irregular running datum exceeds or undershoots a limit value. In part-engine operation, the indicated irregular running datum is determined only for two successive angle segments that are assigned to a combusting and to a non-combusting cylinder.

The method according to the present invention has the advantage that even segment-time transitions that current methods had been not been able to clearly assign to a combustion miss in part-engine operation are able to be evaluated more reliably. This advantageous effect is mainly attributable to the fact that the difference between two segment times of directly successive angle segments is evaluated instead of the segment-time difference between two actually combusting cylinders, and that one of these segment times originates from an actually non-combusting cylinder.

Furthermore, the limit value may be established in a cylinder-specific manner.

According to one example embodiment, a first angle segment may be assigned to an activated cylinder and the second angle segment to a non-combusting cylinder, the irregular running datum being determined as a function of a difference between the segment pass-through times of the first and the second angle segment, and a combustion miss being detected if the irregular running datum undershoots a limit value.

According to an alternative example embodiment, a first angle segment may be assigned to a combusting cylinder and the second angle segment to a likewise combusting cylinder, the irregular running datum being determined as a function of a difference between the segment pass-through times of the first and the second angle segment, and a combustion miss being determined if the irregular running datum exceeds a limit value.

Furthermore, segment times of the not activated cylinders may be distributed according to a first distribution function, and segment times of the activated cylinders may be distributed according to a second distribution function, combustion misses being detected according to another method if a broadening of the segment times of the non-combusting cylinders is equal to or less than a broadening of the segment times of the combusting cylinders, the additional method detecting a combustion miss if the segment time lies within a segment time range defined by the first distribution function.

The limit value may be provided as a function of an engine temperature, an operating period of the combustion engine following the start, a transmission state, an engine speed, and a state of a climate-control compressor.

According to the present invention, a control device for detecting combustion misses in cylinders of a combustion engine in part-engine operation is provided in which only some of the cylinders are activated by the injection of fuel, and a positional angle of the crankshaft is assigned to an angle segment, each angle segment being assigned to the particular cylinder that predominantly provides the torque for moving the crankshaft through the angle segment, and the control device is designed to ascertain an irregular running datum as a function of a deviation of segment pass-through times of directly successive angle segments, and to determine a combustion miss if the irregular running datum exceeds or undershoots a limit value. Furthermore, in part-engine operation, the control device is developed to determine the irregular running datum only for two successive angle segments that are assigned to an activated cylinder and to a non-activated cylinder.

DETAILED DESCRIPTION OF THE INVENTION

Figure 1:
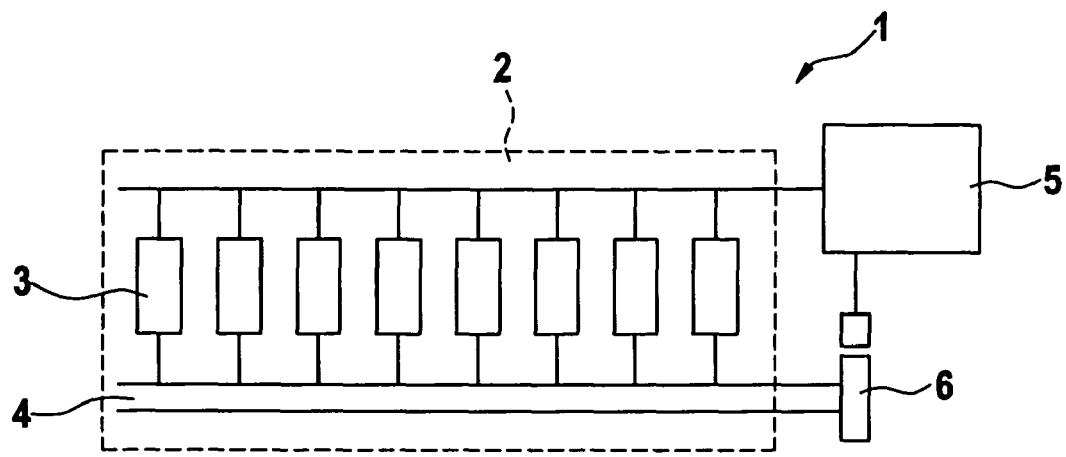
FIG. 1 shows a schematic representation of an engine system.

FIG. 1 schematically shows an engine system 1 having a combustion engine 2 including eight cylinders 3, which drive a crankshaft 4. Combustion engine 2 is operated in the known manner via a control unit 5. A position detector 6, which is able to detect an angular position of crankshaft 4, is coupled to crankshaft 4. With the aid of position detector 6, so-called segment times during which crankshaft 4 passes through an angle segment are able to be determined. An angle segment corresponds to a portion of an engine working cycle and is assigned to a particular cylinder 3 which is predominantly responsible for the particular angular acceleration occurring inside this segment.

A segment time recorded with the aid of position detector 6 is supplied to control unit 5. The segment time corresponds to the cycle time during which crankshaft 4 is in angular positions that are assigned to the particular segment. A combustion miss is able to be inferred by analyzing changes in the angular velocity in the individual segments assigned to a particular cylinder 3.

Figure 2:
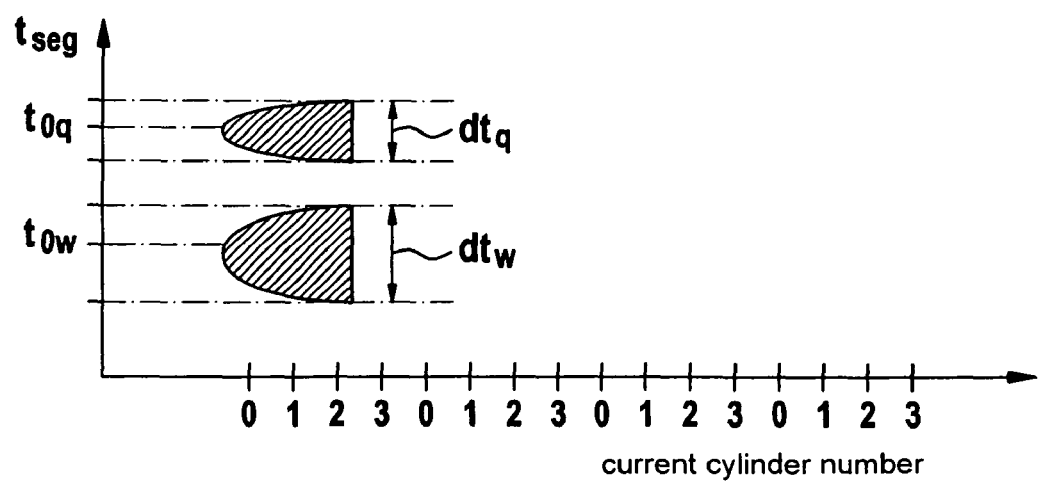
FIG. 2 shows a diagram illustrating the distribution function for segment times in a combusting and a non-combusting cylinder.

To exclude the possibility of erroneously inferring combustion misses in an intentionally not activated cylinder 3 in half-engine operation or part-engine operation in which not all cylinders 3 are activated, no evaluation with regard to combustion misses is implemented for the intentionally not activated cylinders 3. Due to different influences, the segment times in non-combusting cylinders 3 or in combusting cylinders are subject to a certain statistical distribution function, which is schematically shown in FIG. 2 under the assumption of a constant engine torque output and engine speed. In this context, Q(tseg) corresponds to a distribution function for the occurrence of segment time tseg in a regularly non-combusting cylinder 3; $t_{oQ}$ to a segment time of the distribution maximum of Q(tseg); $dt_Q$ to a distribution width (segment time) of distribution Q(tseg); W(tseg) to a distribution function W(tseg) for the occurrence of a segment time tseg in a regularly combusting cylinder, $t_{oW}$ to the segment time of the distribution maximum of W(tseg), and $dt_W$ to the distribution width (segment time) of distribution W(tseg). The distribution functions of the segment times for regularly combusting cylinder 3 or non-combusting cylinder 3 vary due to different influences. These influences include, for example, a broadening of the distribution function by errors of the pulse-generator wheel, a combustion broadening due to random variations in the charge mixture and ignition angles of the combustion position of a cylinder 3, the torque output varying as a function of the operating point, so that the segment times are affected and broadened by torque contributions of the cylinders adjacent in the firing, as well as the broadening by torque contributions of cylinders 3 not assigned to the segment, and the broadening by fluctuations in the segment setpoint input, which may be caused by control and regulating devices.

Using the distribution function shown in FIG. 2 for the segment times for regularly combusting cylinders and regularly non-combusting cylinders 3, possible segment time transitions and their frequency for a system without combustion misses are able to be determined. In part-engine operation, it is possible to use as reference with the segment-time distribution $VT^{ref}(t)$ the combusting or the non-combusting cylinders (i.e., $VT^{ref}(t)=W(t)$ or $VT^{ref}(t)=Q(t)$). In a system without misses, the segment times are distributed according to distribution $VT^{test}(t')=Q(t')$. The frequency across a segment-time difference of $t_{across}$ corresponds to:

$$W(t_{over})=\int_{-\infty}^{\infty}VT^{ref}(t)*VT^{test}(t+t_{over})dt$$

Figure 3:
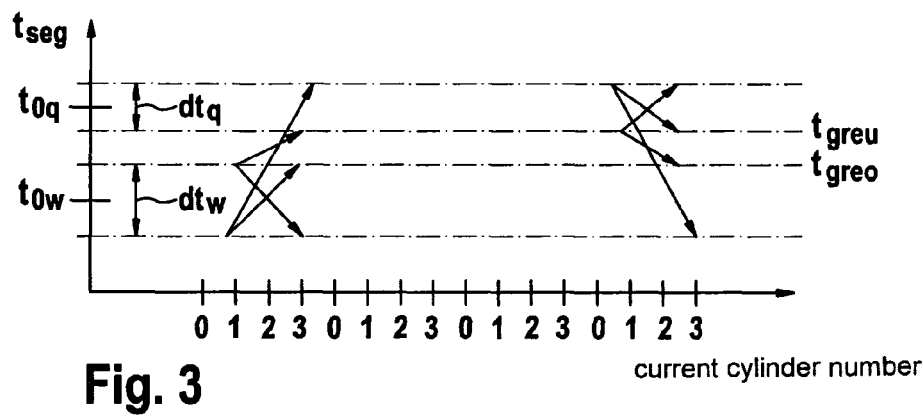
FIG. 3 illustrates the possible segment-time transitions to show the probability of detecting a miss by a conventional method and by the method according to the present invention.

FIG. 3 shows the segment-time ranges for regularly combusting cylinders and regularly non-combusting cylinders as $dt_Q$ and $dt_w$ and possible segment-time transitions in a diagram. The segment-time transitions are denoted by arrows. The segment-time transitions arise when a combusting cylinder is followed by a non-combusting cylinder, or vice versa. Among the segment-time transitions shown by arrows there may be segment times that may lie in the range between lower distribution limit $t_{greu}$ ($t_{greu}$=minimum transition time, which may occur both with two regularly combusting as well as with one regularly and one misfiring cylinder) in a non-combusting cylinder, and upper distribution limit $t_{greo}$ ($t_{greo}$=maximum transition time, which may occur both with two regularly combusting as well as with one regularly combusting and one misfiring cylinder) of a segment time of a combusting cylinder, so that there are shared segment times that may occur with one regularly combusting cylinder and/or with one non-combusting cylinder. It is assumed here that the distribution function for the occurrence of segment times in a regularly non-combusting cylinder also applies to misses.

If a segment time in this range occurs, currently used conventional methods basically make it impossible to decide whether a miss or a proper combustion was present. This effect reduces the obtainable combustion-miss detection rate. In a current conventional method, a segment time is checked as to whether it lies within the segment-time range defined by the distribution function for regularly non-combusting or regularly combusting cylinders, and a combustion miss is inferred therefrom, if appropriate.

According to the present invention, a combustion miss is detected by comparing a segment time of a cylinder that does not combust in part-engine operation, to a segment time of a following combusting cylinder, or by comparing a segment time of a cylinder that combusts in part-engine operation, to a segment time of a following non-combusting cylinder. If the difference between the two segment times lies below a specific limit value, then a miss may be inferred. If the difference lies above the limit value, then proper combustion may be inferred.

A simple coefficient SQDMD for the quality of such a detection method may be defined via the following equation, for example:

$$SQDMD = 1 - \frac{\int_{greu}^{greo} \int_{-\infty}^{\infty} VT^{ref}(t) * VT(t + t_{over}) dt dt_{over}}{\int_{-\infty}^{\infty} \int_{-\infty}^{\infty} VT^{ref}(t) * VT(t + t_{over}) dt dt_{over}}$$

In the direct comparison between the method according to the present invention and a conventional method, it results that the method according to the present invention has an advantage when the broadening of the segment time of the non-combusting cylinders is smaller than that of the combusting cylinders in part-engine operation. This could be confirmed in practice. Therefore, the method according to the present invention has an advantage if the distribution width of the non-combusting cylinders is smaller than that of the combusting cylinders. In an additional specific embodiment, it may therefore be provided to change between the method according to the present invention and the aforementioned conventional method depending on whether the broadening of the segment time of the non-combusting cylinders is smaller than the broadening of the segment time of the combusting cylinders in part-engine operation.

To be able to implement the evaluation independently of the rotational speed, if possible, the calculation of an irregular running may be used. The irregular running generally results from:

$$luts(n) = \frac{(t_{segc}(n+1) - t_{segc}(n) - t_{segcompensation})}{(t_{segc}(n))^3}$$

the formula being applied only to immediately successive cycles in the method according to the present invention, cycle n corresponding to a cycle in which one cylinder is deactivated in part-engine operation, and the next cycle to be compared thereto corresponds to a cycle in which a combustion takes place in the corresponding cylinder. Via the variable $t_{segkompensation}$, which corresponds to an averaged segment time via which the rotational speed gradients are able to be taken into account, and via the denominator, the determined irregular running is able to be determined independently of the rotational speed, if possible, so that a limit value is able to be specified that is largely independent of the rotational speed.

As an alternative, it is also possible to select a sequence of cycles in which a combustion takes place in a cylinder, and the next cycle to be compared thereto corresponds to a cycle in which a cylinder is deactivated in part-engine operation.

Figure 4:
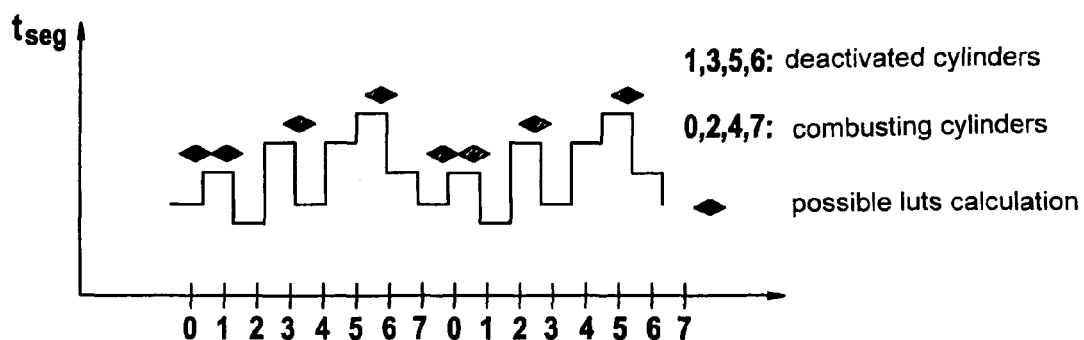
FIG. 4 shows an illustration of the instants of the irregular-running calculation for an 8-cylinder engine having an asymmetrical firing order.

The comparison of the segment times according to the method of the present invention is basically also expandable to systems in part-engine operation having an asymmetrical firing order. In the determination of combustion misses, corresponding angle segments assigned to a non-combusting cylinder are taken into account, which are followed by an angle segment assigned to a combusting cylinder, and vice versa. In the example of an 8-cylinder combustion engine shown in FIG. 4, this applies to segment transitions 0-1, 1-2, 2-3, 3-4, 4-5, and 6-7. Since it must be expected that the segment-time differences in combustion misses are not of equal magnitude for all combusting cylinders, the evaluation of the irregular-running values on the basis of the limit value must be implemented individually for each cylinder pair monitored in this manner. In contrast to conventional methods in which only the combusting cylinders are compared to each other in part-engine operation, this method has the advantage that directly adjacent segment times are able to be compared, so that it will not be necessary to consider the combustion behavior of additional cylinders in the evaluation.

What is claimed is:

1. A method for detecting combustion misses in cylinders of a combustion engine in a part-engine operation, wherein only some of the cylinders are operated by the injection of fuel in the part-engine operation, the method comprising:
    assigning a positional angle of a crankshaft to an angle segment;
    assigning each angle segment to a corresponding cylinder that predominantly provides the torque for moving the crankshaft through the corresponding angle segment;
    determining an irregular running datum as a function of a difference of segment pass-through times of directly successive angle segments; and
    detecting a combustion miss if the irregular running datum one of exceeds or undershoots a predefined limit value;
    wherein, in the part-engine operation, the irregular running datum is determined only for two successive angle segments that are assigned to a combusting cylinder and to a non-combusting cylinder.

2. A method for detecting combustion misses in cylinders of a combustion engine in a part-engine operation, wherein only some of the cylinders are operated by the injection of fuel in the part-engine operation, the method comprising:
    assigning a positional angle of a crankshaft to an angle segment;
    assigning each angle segment to a corresponding, cylinder that predominantly provides the torque for moving the crankshaft through the corresponding angle segment;
    determining an irregular running datum as a function of a difference of segment pass-through times of directly successive angle segments; and
    detecting a combustion miss if the irregular running datum one of exceeds or undershoots a predefined limit value;
    wherein, in the part-engine operation, the irregular running datum is determined only for two successive angle segments that are assigned to a combusting cylinder and to a non-combusting cylinder; and
    wherein:
    a first angle segment is assigned to an activated cylinder;
    a second angle segment is assigned to a non-combusting cylinder;
    the irregular running datum is determined as a function of a difference between the segment pass-through times of the first and the second angle segment; and
    a combustion miss is detected if the irregular running datum undershoots the limit value.

3. The method as recited in claim 2, wherein the limit value is defined in a cylinder-specific manner.

4. The method as recited in claim 2, wherein:
    segment times of non-activated cylinders are distributed according to a first distribution function;
    segment times of activated cylinders are distributed according to a second distribution function; and
    if a broadening of the segment times of the non-combusting cylinders is one of equal to or smaller than a broadening of the segment times of the combusting cylinders, detecting a combustion miss by performing a further step of determining whether the segment time lies within a segment-time range defined by the first distribution function.

5. A method for detecting combustion misses in cylinders of a combustion engine in a part-engine operation, wherein only some of the cylinders are operated by the injection of fuel in the part-engine operation, the method comprising:
    assigning a positional angle of a crankshaft to an angle segment;

assigning each angle segment to a corresponding cylinder that predominantly provides the torque for moving the crankshaft through the corresponding angle segment;

determining an irregular running datum as a function of a difference of segment pass-through times of directly successive angle segments; and detecting a combustion miss if the irregular running datum one of exceeds or undershoots a predefined limit value;

wherein, in the part-engine operation, the irregular running datum is determined only for two successive angle segments that are assigned to a combusting cylinder and to a non-combusting cylinder; and wherein:

a first angle segment is assigned to a non-activated cylinder;

a second angle segment is assigned to a combusting cylinder;

the irregular running datum is determined as a function of a difference between the segment pass-through times of the first and the second angle segment; and a combustion miss is detected if the irregular running datum exceeds the limit value.

6. A method for detecting combustion misses in cylinders of a combustion engine in a part-engine operation, wherein only some of the cylinders are operated by the injection of fuel in the part-engine operation, the method comprising:

assigning a positional angle of a crankshaft to an angle segment;

assigning each angle segment to a corresponding cylinder that predominantly provides the torque for moving the crankshaft through the corresponding angle segment;

determining an irregular running datum as a function of a difference of segment pass-through times of directly successive angle segments; and detecting a combustion miss if the irregular running datum one of exceeds or undershoots a predefined limit value;

wherein, in the part-engine operation, the irregular running datum is determined only for two successive angle segments that are assigned to a combusting cylinder and to a non-combusting cylinder; and wherein the limit value is provided as a function of an engine temperature, an operating period of the combustion engine following the start, a transmission state, an engine speed, and a state of a climate-control compressor.

7. A control device for detecting combustion misses in cylinders in a part-engine operation, wherein only some of the cylinders are operated by the injection of fuel in the part-engine operation, a positional angle of a crankshaft being assigned to an angle segment, each angle segment being assigned to a corresponding cylinder that predominantly provides the torque for moving the crankshaft through the corresponding angle segment, the device comprising:

an arrangement configured to determine an irregular running datum as a function of a difference of segment pass-through times of directly successive angle segments; and an arrangement configured to detect a combustion miss if the irregular running datum one of exceeds or undershoots a predefined limit value, wherein in the part-engine operation, the irregular running datum is determined only for two successive angle segments that are assigned to an activated cylinder and to a non-activated cylinder, and wherein one of the following condition (a) or condition (b) is satisfied:

(a) a first angle segment is assigned to an activated cylinder, a second angle segment is assigned to a non-combusting cylinder, the irregular running datum is determined as a function of a difference between the segment pass-through times of the first and the second angle segment, and a combustion miss is detected if the irregular running datum undershoots the limit value; or (b) a first angle segment is assigned to a non-activated cylinder, a second angle segment is assigned to a combusting cylinder, the irregular running datum is determined as a function of a difference between the segment pass-through times of the first and the second angle segment, and a combustion miss is detected if the irregular running datum exceeds the limit value.

* * * * *